United States Patent
Liu et al.

(10) Patent No.: US 8,406,212 B2
(45) Date of Patent: Mar. 26, 2013

(54) SERVICE FLOW WITH ROBUST HEADER COMPRESSION (ROHC) IN A WIMAX WIRELESS NETWORK

(75) Inventors: Qingchao Liu, Kanata (CA); Wenhui Yuan, Ottawa (CA); Randy Kuang, Kanata (CA)

(73) Assignee: Apple Inc., Cupertino, CA (US)

( * ) Notice: Subject to any disclaimer, the term of this patent is extended or adjusted under 35 U.S.C. 154(b) by 1701 days.

(21) Appl. No.: 11/677,954

(22) Filed: Feb. 22, 2007

(65) Prior Publication Data
US 2007/0195764 A1    Aug. 23, 2007

Related U.S. Application Data

(60) Provisional application No. 60/775,556, filed on Feb. 22, 2006, provisional application No. 60/775,557, filed on Feb. 22, 2006.

(51) Int. Cl.
*H04J 3/24* (2006.01)
(52) U.S. Cl. ........ 370/349; 370/231; 370/252; 370/389; 370/395.21; 370/521; 370/235; 370/392; 370/474; 455/69; 455/72; 455/422.1; 455/452.2
(58) Field of Classification Search .................. None
See application file for complete search history.

(56) References Cited

U.S. PATENT DOCUMENTS

| | | | | |
|---|---|---|---|---|
| 7,106,733 | B2 * | 9/2006 | Fleming | 370/389 |
| 7,290,063 | B2 * | 10/2007 | Kalliokulju et al. | 709/247 |
| 7,529,238 | B2 * | 5/2009 | Fleming | 370/389 |
| 7,738,391 | B2 * | 6/2010 | Melpignano et al. | 370/252 |
| 2004/0042507 | A1 * | 3/2004 | Pelletier et al. | 370/521 |
| 2007/0058679 | A1 * | 3/2007 | Pelletier et al. | 370/477 |
| 2011/0273984 | A1 * | 11/2011 | Hsu et al. | 370/235 |

* cited by examiner

*Primary Examiner* — Willie J Daniel, Jr.
(74) *Attorney, Agent, or Firm* — Meyertons, Hood, Kivlin, Kowert & Goetzel, P.C.

(57) ABSTRACT

A robust header compression (ROHC) controller provides for service flow processing of a ROHC channel in a WiMAX wireless communication system. The ROHC controller controls the negotiations of the MS ROHC capabilities during its registration and the negotiations of the ROHC channel parameters during ROHC enabled service flow setup; the MS ROHC capabilities including ROHC compression and decompression capabilities and ROHC channel and feedback strategies; the channel parameter negotiation covers the ROHC profile set and feedback channel information in addition to the 16e/12D standard. The ROHC controller receives a service flow request for a ROHC enabled service flow, wherein the request includes a QoS profile.

15 Claims, 11 Drawing Sheets broadband wireless communication network environment 10

WiMax base transceiver station 104 backhaul processing module 210 mobile station 20-22

ROHC controller modes

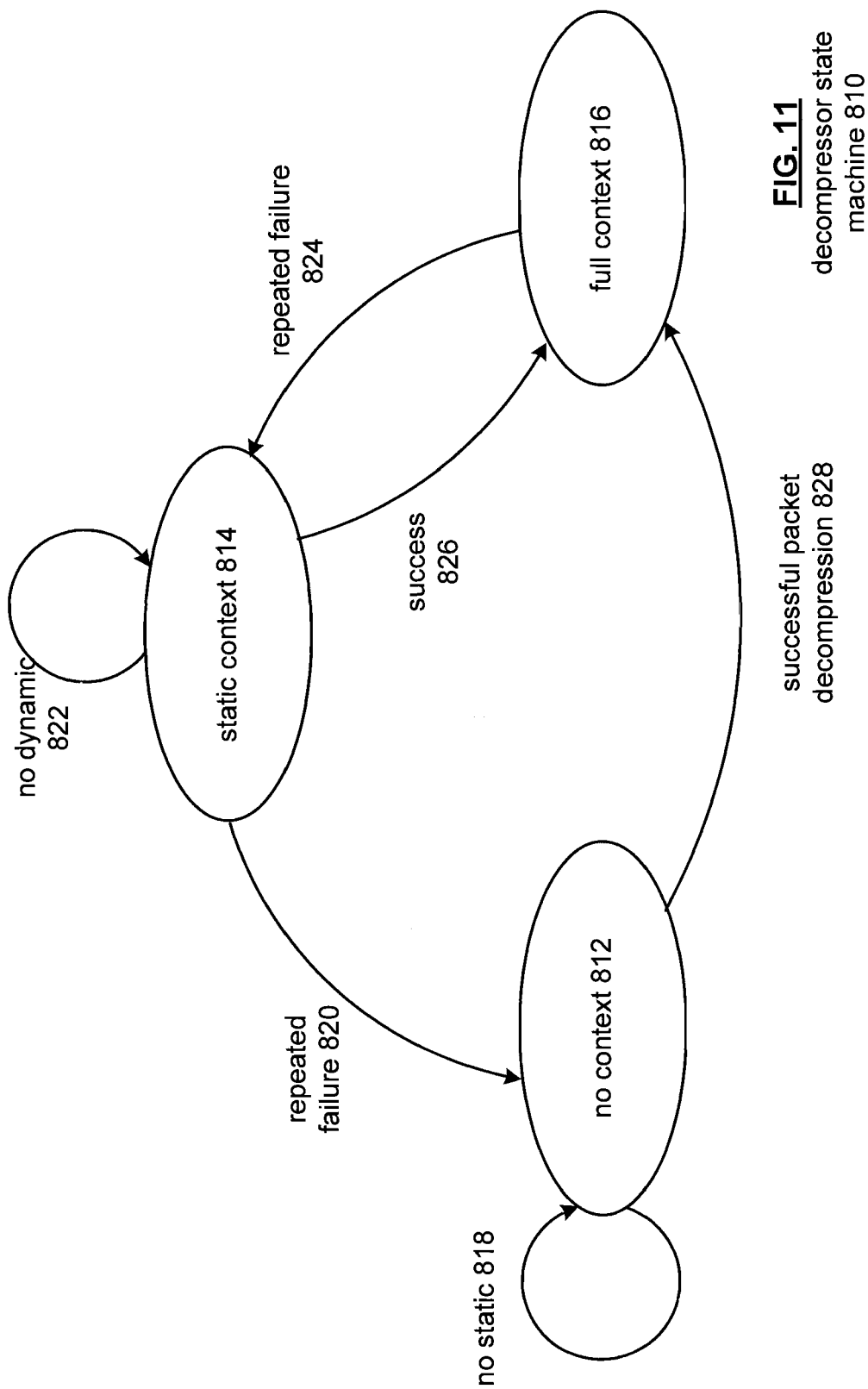

SERVICE FLOW WITH ROBUST HEADER COMPRESSION (ROHC) IN A WIMAX WIRELESS NETWORK

CROSS-REFERENCE TO RELATED APPLICATIONS

The present application claims priority pursuant to 35 USC §119(e) to U.S. Provisional Application Ser. No. 60/775,556, entitled "Method & Apparatus of WiMAX Robust Header Compression ("Multiplexing"), filed Feb. 22, 2006, and to U.S. Provisional Application Ser. No. 60/775,557, entitled "Robust Header Compression (ROHC) over WiMax," filed Feb. 22, 2006, each of which is hereby incorporated by reference herein in its entirety.

BACKGROUND

1. Technical Field

The present invention relates generally to broadband wireless access data networks, and more particularly to data routing functionality for such data networks.

2. Related Art

Wireless data networks have provided mobile connectivity for subscribers under fixed wireless and/or mobile wireless modes. Generally, fixed wireless access technology has evolved to provide "last mile" connectivity to households and/or businesses providing broadband data rates under IEEE §802.16d and IEEE § 802.16e specifications. In regions without pre-existing physical cable or telephone networks, such technology may provide a viable alternative for broadband access.

For large-scale deployment, mesh networks require deployment of hundreds to thousands of mesh base transceiver stations, with each base transceiver station requiring backhaul wire and/or optic fiber cable access to Internet networks and/or backbones. As a result, large numbers of cables have been needed for the backhaul access, incurring large deployment costs in time, material, and labor. Further, such deployments incur data transmission delays associated with accessing the backhaul networks, undercutting the advantages that otherwise may have been realized by the bandwidth available by the mesh data network technology.

In general, a base transceiver station may provide backhaul data path access from and to mobile stations and subscriber stations to an access service network gateway (ASN-GW) but needs to minimize these adverse factors. Further, the air links between a base transceiver station and a mobile station is less than favorable for multimedia-rich data transmissions, where transmission latency and the bit error rates of such connections are less than optimal. Accordingly, a need exists for increased performance of traffic over the air link between mobile stations and WiMAX base transceiver station.

SUMMARY

Provided is a method in a robust header compression (ROHC) controller for service flow provisioning of a ROHC wireless connection in a WiMAX wireless communication system.

Following registration of a mobile station with a WiMAX wireless communication system, in which device capabilities are establishes with a base transceiver station, the ROHC controller of the respective device (which may be either the base transceiver station and/or the mobile station) receives a service flow request for a ROHC enabled service flow, wherein the request includes a QoS profile. The ROHC controller performs a dynamic service addition (DSA) to create the ROHC channel based upon the QoS profile. The ROHC negotiates the MS ROHC capabilities and ROHC channel parameters. With this information, a ROHC channel is in place, and the ROHC controller compresses and decompresses the ROHC sessions within the ROHC enabled service flow and transmits via the ROHC channel.

ROHC capability negotiations covers ROHC channel allocation strategy, it can be one-to-one mapping to the conventional air link service flow channel, or allocating one shared airlink channel for those ROHC enabled service flows with the same QoS profile and to the same mobile station (MS). The negotiation also covers ROHC feedback strategy, dedicated or piggybacking or interspersing. If it is dedicated, a one-to-one channel allocation is made for the feedback channel. ROHC channel parameters covers ROHC channel profile set and feedback channel information, these are to the current 16e/12D standard.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

FIG. 11 is a state diagram relating to the decompressor state transitions for the ROHC modes according to an embodiment of the invention.

DETAILED DESCRIPTION OF THE DRAWINGS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents. It is further understood that as used herein, terms such as "coupled", "connected", "electrically connected", "in signal communication", "communicatively coupled" and the like may include direct connections between components, indirect connections between components, or both, as would be apparent in the overall context of a particular embodiment. The terms "transmit," "transmitted," or "transmitting" is intended to include, but not be limited to, the electrical transmission of a signal from one device to another.

Figure 1:
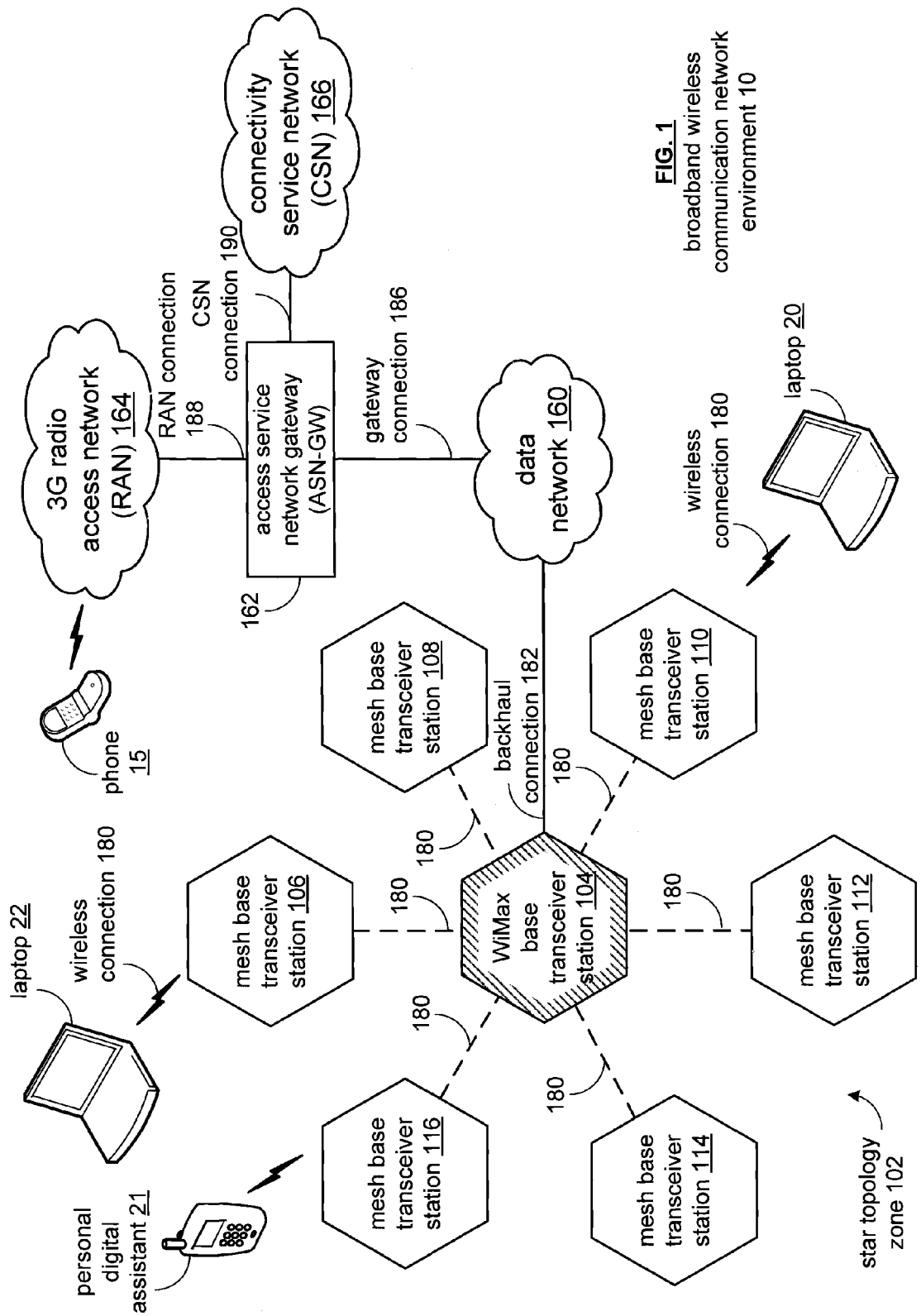
FIG. 1 is a functional block diagram illustrating a wireless communication network environment that includes circuit devices and network elements and the operation thereof according to an embodiment of the invention.

FIG. 1 is a functional block diagram illustrating a wireless communication network environment 10 that includes circuit devices and network elements and the operation thereof according to an embodiment of the invention. More specifically, a star topology zone 102 is a part of the network environment 10, which can include, by way of example, one or more of a data network 160, an access service networks gateway (ASN-GW) 162, a connectivity service network (CSN) 166, and a 3G radio access network (RAN) 164. The base transceiver stations operate under broadband wireless access specifications such as WiMAX (that is, IEEE §802.16d for fixed wireless access and IEEE §802.16e for mobile wireless access), and support mesh access specifications (such as under IEEE §802.11s).

The broadband wireless communication network environment 10, via a star topology zone 102 that includes the mesh and wired base transceiver stations, operates to deliver broadband multimedia data ubiquitously over wireless links at multiples of the speed of traditional circuit-switched wireless systems, and over a far greater coverage area than other wireless technologies (for example, IEEE §802.11 WiFi technology). In this manner, the network environment 10 is designed to deliver wireless access at similar costs, but across tens of kilometers and realizing greater performance and higher data throughput. That is, in contrast to other wireless technologies, WiMAX is capable of providing high-bandwidth over distance, whereas WiFi (under IEEE §802.11 specifications) may provide high bandwidth (but not distance), and cellular systems may provide distance, but not bandwidth.

Accordingly, the network environment 10 can provide users uninterrupted and untethered access to a variety of high-bandwidth services not only around offices, homes, coffee shops, airports, and hotels, but also as users roam in rural, suburban, and metropolitan settings.

In this manner, a plurality of wireless communication devices are illustrated as coupled to the wireless communication network environment 10 to provide high-bandwidth services to users. The wireless communication devices 20, 22 and 15, may be, by way of example, laptop computers 22 and 20, cellular telephones 15, and other wireless communication devices, such as personal digital assistants 21, personal computers, et cetera. The details of the wireless communication network environment 10 will be described in greater detail with reference to FIGS. 2 through 11.

The star topology zone 102 includes a plurality of mesh base transceiver stations 106-116, which are coupled to each other in a fixed wireless configuration via wireless connections 180. Each of the mesh base transceiver stations 106-116 are also in communication with the WiMAX base transceiver station 104 through the wireless connections 180. The WiMAX base transceiver station 104 provides a backhaul connection 182 to the mesh base transceiver stations 106-116 for access to the data network 160. The backhaul connection may be in the form of a wireless or "wired" (i.e., cable or fiber optic) connection.

In general, in a wirelessly-deployed mesh network, each of the base transceiver stations have a backhaul connection 182 to the data network 160 (such as an Internet backbone and/or a T1/E1 backhaul as well). In the star topology zone 102, a physical backhaul connection 182 is replaced by a fixed wireless connection optimized to minimize the number of hops to access the data network. In this manner, the cost and inefficiency of providing a physical backhaul connection 182 (such as through cables, fiber optics, et cetera) is minimized. The data network 160 may be provided as an Internet protocol network or other form of packet data network capable of facilitating data communication between the WiMAX base transceiver station 104 and the data network 160.

The wireless connections 180 may be provided under industry standards specification, such as IEEE §802.16d specification for fixed wireless access and IEEE §802.16e for mobile wireless access upon which WiMAX technologies are based, as well as IEEE §802.11s for mesh-based wireless access when applicable. Under the WiMAX standards specification, a base transceiver station may provide up to seventy-five megabits per second bandwidths up to a fifty-kilometer range. The radio frequency band under the WiMAX specification is within 2.6 GHz and 5.8 GHz. Also, various signal modulation techniques may be used in the wireless channel, such as QPSK (Quadrature Phase Shift Keying), BPSK (Binary Phase Shift Keying), 16 QAM, 64 QAM, et cetera. Wireless connections 180 with the mobile stations/subscriber stations 20, 21, and 22 are provided under the mobility extension to the IEFE §802.16d specification (that is, the IEEE §802.16e specification). Accordingly, the wireless connections provide the device and/or the users to transfer in and out of cell coverage provided by each of the mesh base transceiver stations 106 through 116, as well as the WiMAX base transceiver station 104.

In the wireless connections 180 may also be provided as WiMAX air links, robust header compression connections, and/or non-ROHC connections. In general, wireless connections 180 can be expensive and scarce resources that tend to be lossy in nature, that have high bit error rates, long round-trip times, limited bandwidths, et cetera. With respect to real-time service flows such as audio, voice, video, et cetera, such wireless connections tend to be problematic. In these instances, ROHC can mitigate the unfavorable characteristics of wireless. Robust header compression facilitates the integration of an IP network with a wireless network of the broadband wireless configuration network environment 10. It also uses the bandwidth of the wireless connection efficiently by reducing header overhead. In effect, robust header compression improves the quality of the wireless connection.

As an example, voice datagrams, carried in a packet payload using IPv6/UDP/RTP, have a size on the order of 20 bytes, while the header size is on the order of 100 bytes. Robust header compression can achieve sizes of one-to-four bytes, reducing the overhead in the present example by a factor of 100 and the total bandwidth consumption by a factor of six.

The use of ROHC channels, however, have not been addressed with respect to WiMAX air links, and the application of the former compression on a service flow basis has been inefficient—extra overhead costs are incurred, reducing the performance of ROHC, and increasing the cost of the products. Accordingly, the ROHC mechanism provided in as QoS-based, allowing minimizing the management and data path overhead for WiMAX devices to support ROHC transmission links. Further discussion regarding implementation of ROHC in the communication network environment 10 is discussed in detail with reference to FIGS. 2 through 11.

The data network 160 is coupled to the access service networks gateway 162 via a gateway connection 186. The access service networks gateway 162 is a subscriber access gateway that facilitates communications with the star topology zone 102 and that also concentrates subscriber traffic from peer-based transceiver stations 104 through 116. The primary responsibilities of the access service networks gateway 162 is to provide mobility services to mobile IP and simple Internet protocol user access devices and processing of subscriber-controlled bearer traffic. The access service networks gateway 162 couples to a wireless access network, such as a 3G radio access network 164, via radio access network ("RAN") connection 188.

The 3G radio access network may be provided under wireless transmission standards, including, for example, 1×EV-DO (Evolution Data Only, Evolution Data Optimized), W-CDMA (Wideband Code Division Multiple Access), UMTS (Universal Mobile Telecommunications System), LTE (Long Term Evolution), SAE (System Architecture Evolution), et cetera. In general, 3G refers to next generation wireless technologies extended beyond personal communication services. Further iterations of such networks are anticipated, such as 4G, which serves as a successor of 3G and further includes data transmissions supporting multimedia messaging, mobile TV, high definition TV content, DVB and minimal services, such as voice and data at any time and any place. The term 4G is also referred to as 3G and beyond.

The access service networks gateway 162 is also coupled to a connectivity service network via Connectivity Service Network ("CSN") connection 190 which may access the connectivity service network 166 via a home agent based network. Connectivity service network 166 provides service features, such as services authorization, IP host configuration management, and tunneling between the wireless communication device and the connectivity service network 166.

Further provided, via the connection 190, from the connectivity service network 166 is mobility management for the wireless communication device between base transceiver stations. In general, the connectivity service network 166, via the star topology zone 102, provides subscribers with such services as dynamic host configuration protocol ("DHCP") server, often occasion, authorization and accounting ("AAA"), file transfer protocol ("FTP"), inter-operator and inter-technology roaming and other such services. The star topology zone 102 may be organized and structured through operations, administration and maintenance ("OA&M") functionality to facilitate the entry and removal of its constituent mesh base transceiver stations.

As noted, the broadband wireless communication network environment 10 provides increased bandwidth and coverage for support of multimedia applications that include multiple forms of information content and information processing (for example, text, audio, graphics, animation, video, interactivity) to inform and/or entertain a user. Nevertheless, as the amount of users increase, or the data size associated with a form of multimedia content increases, data compression is used to avoid overtaxing network resources. When the network resources are overtaxed, then multimedia application performance may suffer and frustrate users of the technology. Also, other routing technologies may be employed, affecting the processing and routing of data packet headers, which are used for conveying or transporting a data payload to a user over the network environment 10.

In this regard, the wired base transceiver station, providing WiMAX and mesh communications, creates uplink and downlink service flow data paths that can be configured to support various packet transmission formats. Further, to increase data throughput, the wired base transceiver station provides distributed processing functionality for front end and backhaul processing.

Figure 2:
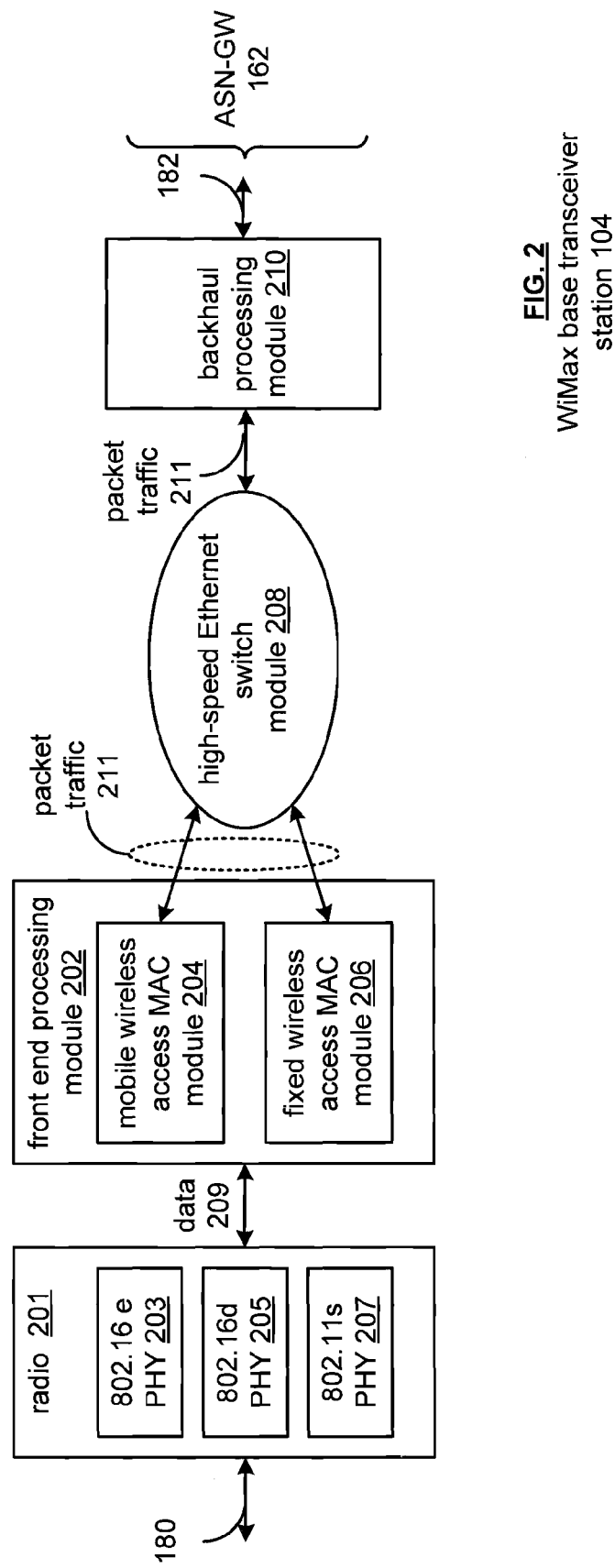
FIG. 2 is a functional block diagram of a WiMAX base transceiver station according to an embodiment of the invention.

FIG. 2 is a functional block diagram of a WiMAX base transceiver station 104. The WiMAX base transceiver station 104 is based upon a multi-processor design for increased throughput and processing capability for the data packets routed via the base transceiver station. The base transceiver station 104 includes a radio 201, a front end processing module 202, a high-speed Ethernet switch module 208, and a backhaul processing module 210.

The radio 201 includes radio frequency units 203, 205, and 207. The physical layer module 203 provides for mobile WiMAX wireless data communications under IEEE §802.16e, the physical layer module 205 provides for fixed WiMAX wireless data communications under IEEE §802.16d, and the physical layer module 207 provides for wireless mesh data communications under IEEE §802.11s. As wireless communication specifications change, evolve, or are otherwise added, the physical layer module 201 may similarly include other radio interfaces to accommodate varying wireless communications specifications.

The radio 201 allows data to be received from and sent to the WiMAX base transceiver station 104. For data received from the physical layer module 201, (for example, inbound data), the physical layer module 201 provides the data 209 to the front end processing module 202 for further processing and/or routing to the backhaul processing module 210 via the packets 211 routed by the high-speed Ethernet switch module 208. The radio 201 is discussed in further detail with reference to FIG. 3.

The front end processing module 202 may include mobile wireless access MAC (media access control) modules 204 and fixed wireless access MAC modules 206. The mobile wireless access MAC module 204 provides mobile wireless communications over the wireless connection 180 to mobile/subscriber stations (MS/SS) according to the IEEE §802.16e specification. The fixed wireless access MAC module 206 provides communications with subscriber stations and the backhaul network according to the IEEE §802.16d specification, and/or the IEEE §802.11s mesh specification, accordingly.

The front end processing module 202 provides MAC functionality including, without limitation, over-the-air-provisioning such as air link resource scheduling, air link channel management, MS/SS and BTS messaging, et cetera. The front end processing module 202 also includes an executable physical layer and radio frequency software code to support wireless connection 180, such as for WiMAX air links, ROHC connections, and/or non-ROHC connections.

The high-speed Ethernet switch module 208 switches packet traffic 211 between the front end processing module 202 and the backhaul processing module 210. A suitable rate capacity for packet transfer is one gigabit per second (such as that set out under the IEEE §802.3z specification).

The backhaul processing module 210 is communicatively coupled to ASN-GW 162 through a backhaul connection 182. The backhaul processing module 210 operates to process the packets of traffic through the WiMAX base transceiver station 104. The creation and configuration of data paths is discussed in detail with reference to FIGS. 3 through 11.

Figure 3:
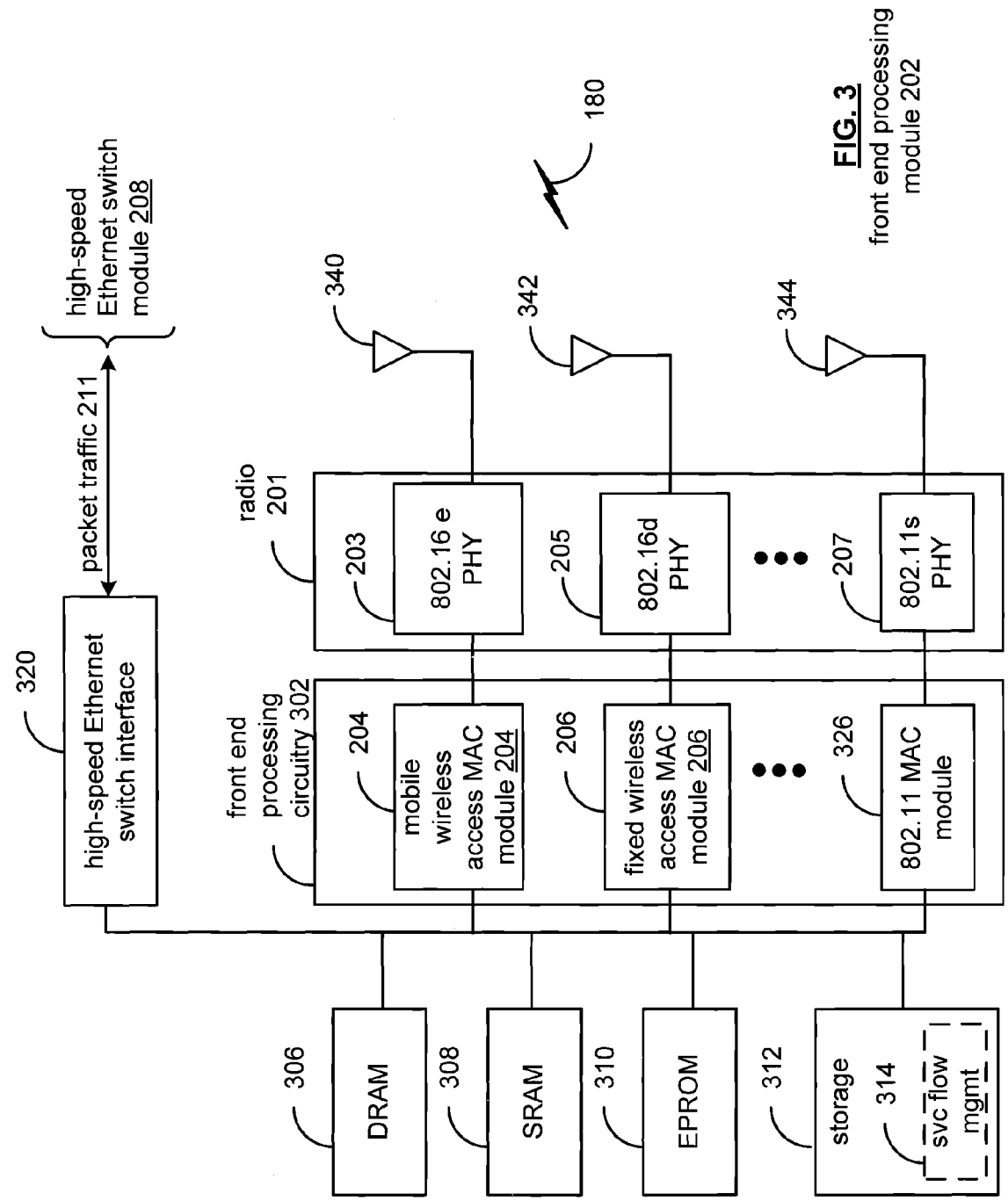
FIG. 3 is a block diagram illustrating a front end processing module of a WiMAX base transceiver station constructed according to an embodiment of the invention.

FIG. 3 is a block diagram illustrating the front end processing module 202 constructed according to an embodiment of the invention. The front end processing module 202 supports a plurality of heterogeneous physical layer modes (for example, IS-95A, IS-95B, IS-2000, GSM-EDGE and/or various 3G and 4G standards specifications that are compatible with the teachings herein).

The front end processing module 202 includes front end processing circuitry 302, dynamic RAM 306, static RAM 308, EPROM 310, and at least one data storage device 312, such as a hard drive, optical drive, tape drive, et cetera. These components (which may be contained on a peripheral processing card or module) intercouple such that the memory contents are available to the front end processing circuitry 302. The high-speed Ethernet switch interface 320 communicatively couples the front end processing module 202 to the backhaul processing module 310 via the high-speed Ethernet switch module 208.

The MAC modules 204, 206, and 326 couple to the front end processing circuitry 302 via the radio frequency (RF) units 203, 205, and 207, respectively, to provide front end functionality to the WiMAX base transceiver station 104. Each of these digital signal processing modules 204, 206, and 326 perform digital signal processing for a respective sectors (for example, sector one, sector two, or sector three) serviced by the base transceiver station 104 under the appropriate mobile wireless and/or fixed wireless access specifications.

The MAC module 204 supports mobile wireless access under the IEEE §802.16e specification. The MAC module 206 supports fixed wireless access under the §802.16d specifications. The MAC module 326 supports wireless data access under the §802.11 specifications, such as the 802.11s mesh specification. Thus, each of the digital processing modules 204, 206, and 326 will perform some or all of the processing operations described with reference to FIGS. 9 through 11.

The MAC modules 204, 206, and 326 may be implemented by the front end processing circuitry and operational instructions stored in memories 205, 208, 310 and/or 312. The front end processing circuitry 302 may be implemented in logic, in operational instructions via software, or a combination of technologies to accommodate timing and/or response requirements of the MAC modules 204, 206, and 326 and the PHY modules 203, 205, and 206.

The RF units 203, 205, and 207 couple to antennas 340, 342, and 344, respectively, and support wireless communication between the WiMAX base transceiver station 104 and the mobile and/or fixed terminals via the MAC modules 204, 206, and 326, respectively. The RF units 203, 205 and 207, operating as physical layer modules, provide digital baseband transmission processes based upon configuration signals from the MAC modules. The RF units attend to the transmission of the raw bit stream, defining parameters such as data rates, modulation method, signaling parameters, transmitter/receiver synchronization, et cetera.

The functional logic provided by the front end circuitry may be as hardware, software, firmware, or a combination thereof, implemented using application specific integrated circuits ("ASIC") or systems-on-chips (where variations may include gate array ASIC design, full-custom ASIC design, structured ASIC design, et cetera), application specific standard products ("ASSP"), programmable gate array ("PGA") technologies (such as system programmable gate arrays ("SPGA"), field programmable gate arrays ("FPGA")), digital signal processors ("DSP"), et cetera.

Structures and operational instructions regarding robust header compression are stored in storage 312. The service flow management operational instructions are downloaded to the front end processing circuitry 302 and/or the DRAM 306 for execution by the processor 302. While the ROHC operational instructions are shown to reside within storage 312 within the front end processing module 202, the ROHC operational instructions may also be loaded onto portable media such as magnetic media, optical media, or electronic media. Further, the service flow management 314 structure and/or operational instructions may be electronically transmitted from one computer to another across a data communication path.

Upon execution of the operational instructions and structures regarding the service flow management 314, the front end processing module 202 performs operations according to the methods and processes described herein with reference to FIGS. 1 through 11. Further, the structure of the WiMAX base transceiver station 104 illustrated is only one of the varied base station structures that could be operated according to the descriptions contained herein.

Figure 4:
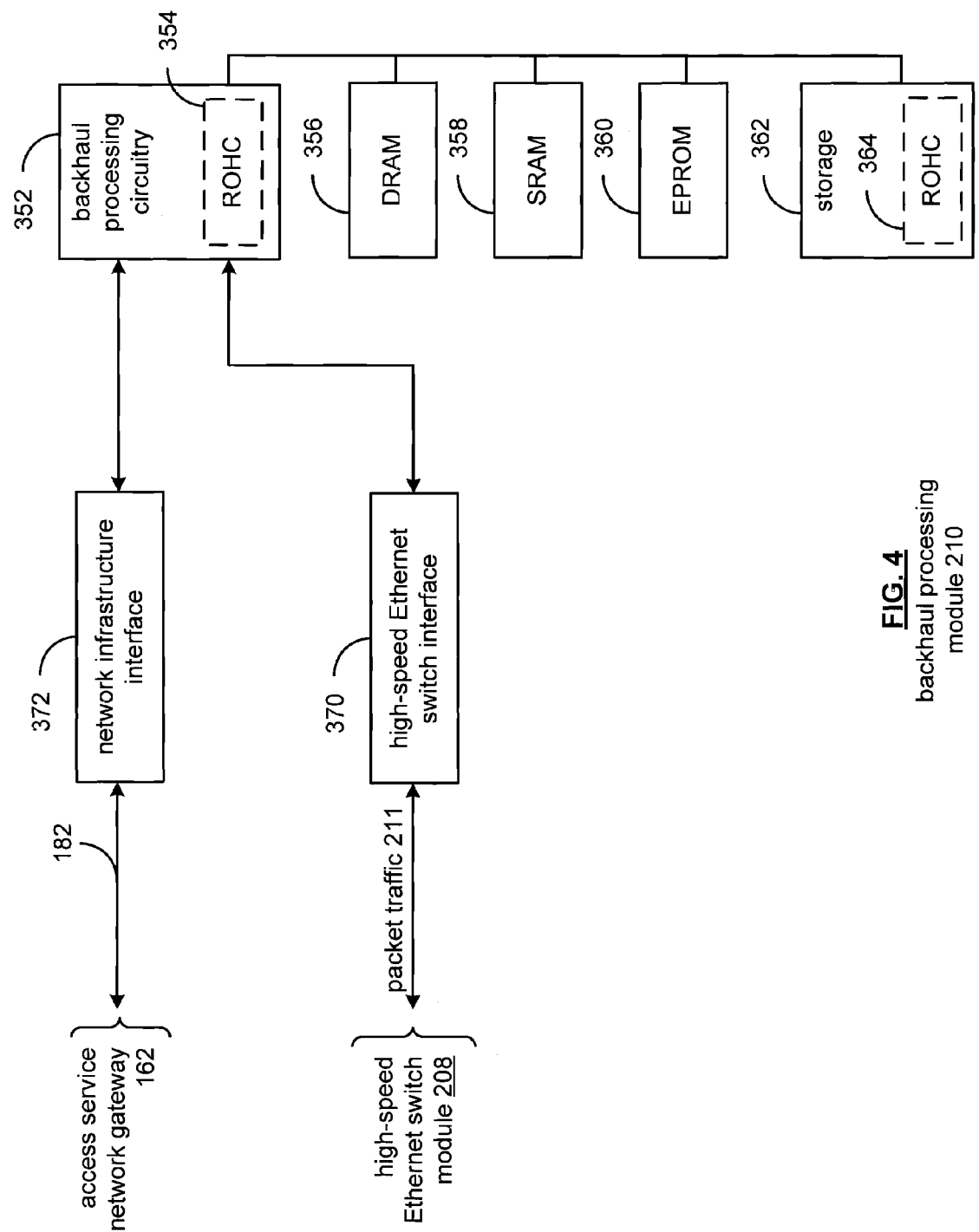
FIG. 4 is a block diagram illustrating a backhaul processing module of a WiMAX base transceiver station constructed according to an embodiment of the invention.

FIG. 4 is a block diagram illustrating the backhaul processing module 210 constructed according to an embodiment of the invention. The backhaul processing module 210 includes backhaul processing circuitry 352, dynamic RAM 356, static RAM 358, EPROM 360, and at least one data storage device 362, such as a hard drive, optical drive, tape drive, et cetera. These components (which may be contained on a peripheral processing card or module, and consolidated into a lesser number of components than described above) intercouple to provide data resources to the backhaul processing circuitry 352.

Communicatively coupled to the backhaul processing circuitry 352 is a high-speed Ethernet switch interface 370, which communicatively couples the backhaul processing module 210 to the front end processing module 202 via the high-speed Ethernet switch module 208 to provide transfer of packet traffic 211. Also coupled to the backhaul processing circuitry 352 is a network infrastructure interface 372, which communicatively couples the backhaul processing module 210 via a backhaul connection 182 with an ASN-GW 162 (such as via the data network 160 of FIG. 1) and the OAM entities for the WiMAX base transceiver station 104.

The functional logic provided by the backhaul processing circuitry may be as hardware, software, firmware, or a combination thereof, implemented using application specific integrated circuits ("ASIC") or systems-on-chips (where variations may include gate array ASIC design, full-custom ASIC design, structured ASIC design, et cetera), application specific standard products ("ASSP"), programmable gate array ("PGA") technologies (such as system programmable gate arrays ("SPGA"), field programmable gate arrays ("FPGA")), digital signal processors ("DSP"), et cetera.

Structures and operational instructions regarding the protocol stack 364 are stored in storage 362. The protocol stack 364 is downloaded to the backhaul processing circuitry 352 and/or the DRAM 356 as the ROHC operational instructions 354 for execution by the processor 352. While the protocol stack is shown to reside within storage 362 within the backhaul processing module 210, the protocol stack may also be loaded onto portable media such as magnetic media, optical media, or electronic media. Further, the ROHC operational instructions 364 may be electronically transmitted from one computer to another across a data communication path.

Upon execution of the operational instructions and structures regarding the ROHC 354, the backhaul processing module 210 performs operations according to the methods and processes described herein with reference to FIGS. 1 through 11. Further, the structure of the WiMAX base transceiver station 104 illustrated is only one of the varied base station structures that could be operated according to the descriptions contained herein.

Figure 5:
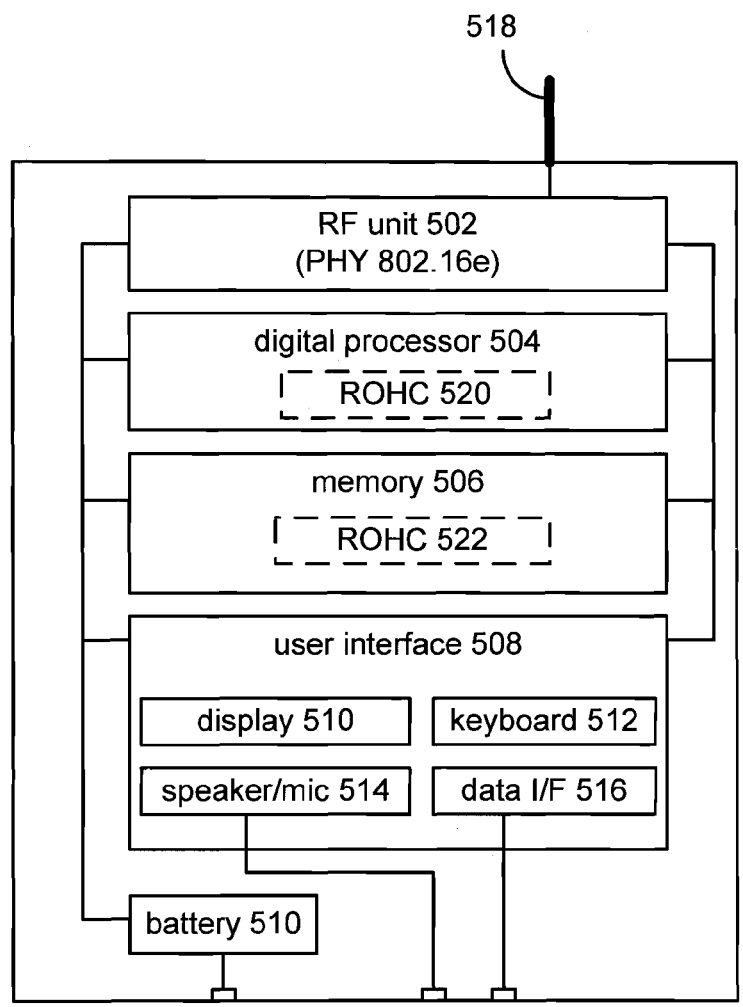
FIG. 5 is a block diagram illustrating a mobile station according to an embodiment of the invention.

FIG. 5 is a block diagram illustrating a mobile station 20-22 that performs the operations previously described herein. The mobile station 20-22 supports standardized operations that are compatible with the teachings of the disclosure, with or without modification. In other embodiments, however, the mobile station 20-22 may support other operating standards.

The mobile station 20-22 includes an RF unit 502 implementing a physical layer such as IEEE §802.16e, a digital processor 504, and a memory 506. The RF unit 502 couples to an antenna 518 that may be located internal or external to the case of the mobile station 20-22. The digital processor 504 may be an Application Specific Integrated Circuit (ASIC) or another type of processor that is capable of operating the mobile station 20-22.

The memory 506 includes both static and dynamic components, for example, dynamic RAM, static RAM, ROM, EEPROM, et cetera. In some embodiments, the memory 506 may be partially or fully contained upon an ASIC that also includes the processor 504.

A user interface 508 includes a display 510, a keyboard 512, a speaker/microphone 514, and a data interface 516, and may include other user interface components. The RF unit 502, the digital processor 504, the memory 506, and the user interface 508 couple via one or more communication buses/links. A battery 510 also couples to and powers the RF unit 502, the digital processor 504, the memory 1008, and the user interface 1010.

Operational instructions of the robust header compression 520 are stored in memory 522. The operational instructions of the ROHC 522 are downloaded to the processor 504 as ROHC 520 for execution by the digital processor 504. The ROHC 520 may also be partially executed by the RF unit 502 in some embodiments. The ROHC 520 may be programmed into the mobile station 20-22 at the time of manufacture, during a service provisioning operation, such as an over-the-air service provisioning operation, or during a parameter updating operation. Upon execution, the operational instructions of the ROHC 520 cause the mobile station 20-22 to perform operations according to the present invention previously described with reference to the mobile stations of FIGS. 1 through 11.

The structure of the mobile station 20-22 illustrated is only an example of one mobile station structure. Many other varied mobile station structures could be operated according to the teachings of the present disclosure. Upon execution of the ROHC 520, the mobile station 20-22 performs operations according to the present invention previously described herein in servicing a wireless connection 180.

Figure 6:
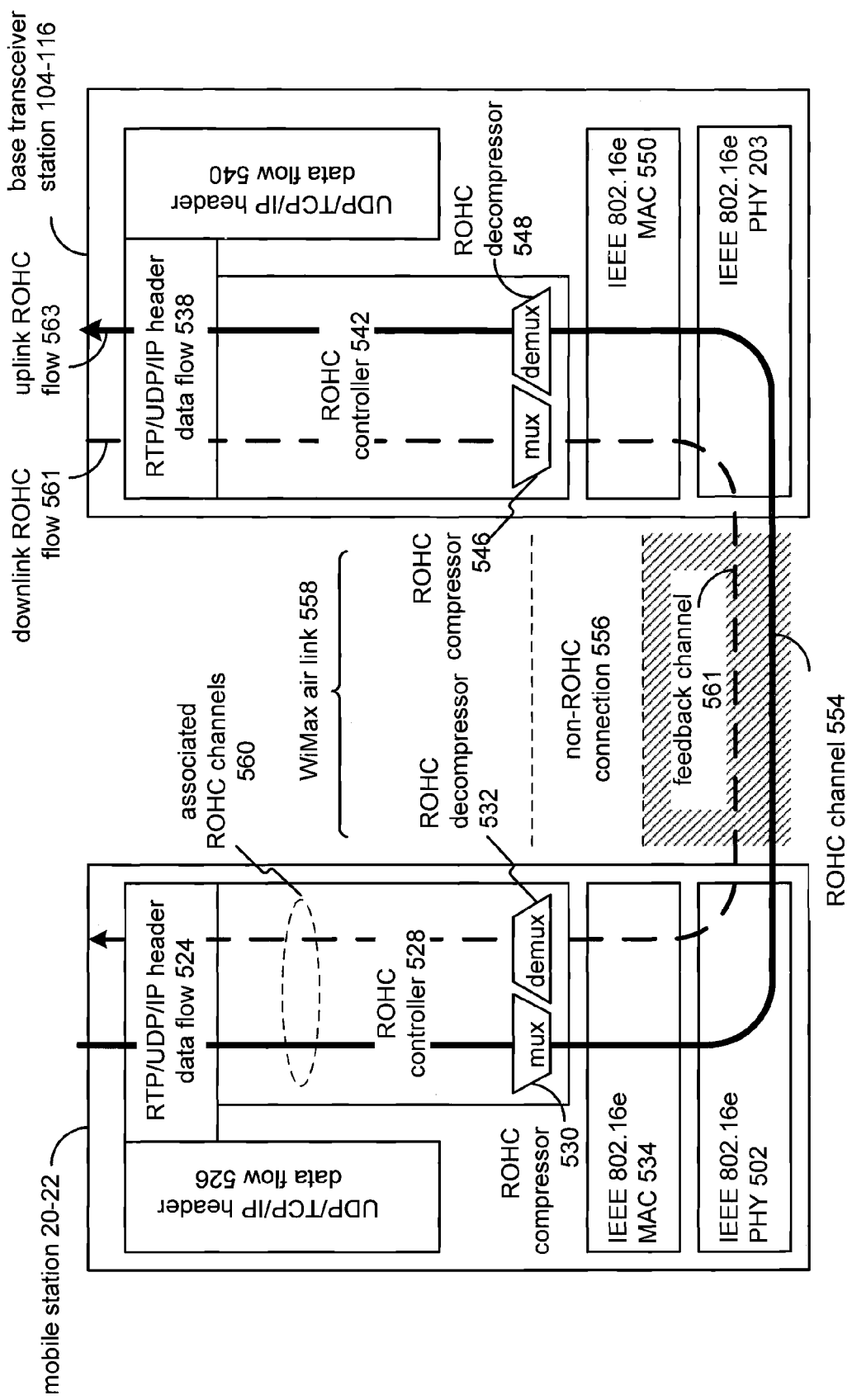
FIG. 6 is a block diagram illustrating ROHC connections between a mobile station and a WiMAX base transceiver station according to an embodiment of the invention.

FIG. 6 is a block diagram illustrating wireless connections between a mobile station 20-22 and a base transceiver station 104-116. The mobile station 20-22 includes a ROHC controller 528, a medium access control (MAC) layer 534 and a physical layer (PHY) 502. The ROHC controller 528 includes a ROHC compressor 530 and a ROHC decompressor 532. The mobile station 20-22 processes packet data content, such as via RTP/UDP/IP dataflow 524 and/or a UDP/TCP/IP dataflow 526, for user playback and/or interaction via the user interface 508 (see FIG. 5), or for user interaction to the network via the base transceiver station 104-116.

In general, the mobile station 20-22 and the base transceiver station 104-116 are capable of routing ROHC service flows on QoS service classifiers. That is, the bandwidth and other channel characteristics may be adjusted to accommodate similarly classified service flows, instead of creating dedicated ROHC channels for each of the ROHC enabled service flows. That is, the management overhead is reduced, and the ability to manage the WiMAX airlink channels 558.

The base transceiver station 104-116 includes a ROHC controller 542, a medium access control (MAC) layer 550, and a physical (PHY) layer 203. The base transceiver station 104-116. The ROHC controller 528 includes a ROHC compressor 530 and a ROHC decompressor 532. A RTP/UDP/IP header dataflow 538 and/or a UDP/TCP/IP header dataflow 540 are received and transmitted by the mobile station 20-22 for playback to a user via the user interface 508 (see FIG. 5). The ROHC controller 528 and the ROHC controller 542 provide highly-robust and efficient header compression for packets implementing RTP/UDP/IP (Real-Time Transport Protocol, User Datagram Protocol, Internet Protocol) headers.

In general, UDP (User Datagram Protocol) is a transport layer protocol used by applications including the Domain Name System (DNS), streaming media applications (such as IPTV), Voice over IP (VoIP), Trivial File Transfer Protocol (TFTP), online games, et cetera.

The Real-time Transfer Protocol (RTP) provides a packet format for delivering audio over the Internet. The protocol is used in streaming media systems (in conjunction with the Real-time Streaming Transfer Protocol (RSTP)) as well as videoconferencing and push to talk systems (such as with H.323 or Session Initiation Protocol). Applications using RTP are less sensitive to packet loss, but typically very sensitive to delays.

The mobile station 20-22, via the ROHC controller 528, and the base transceiver station 104-116, via the ROHC controller 542, accepts and transports speech and/or video data streams over a WiMAX airlink 558. The WiMAX airlink 558 may be provided as a non-ROHC connection 556 or a ROHC connection 554. The determination of whether to transport data over the WiMAX air link 558 as either a non-ROHC connection 556 or a ROHC connection 554 is based upon a flow classification that is QoS-based.

Generally, the ROHC connection 554 is created for service flows having latency sensitive data or high bandwidth data such as audio, visual, and/or multimedia data. In this regard the mobile station 20-22 and the base transceiver station 104-116 provide an ROHC instance (that is, an ROHC compressor instance or a ROHC decompressor instance). Either the mobile station 20-22 or the base transceiver station 104-116 may initiate, through a dynamic service request (either as a dynamic service addition or a dynamic service change), for an ROHC connection 554.

Also, multiple ROHC enabled service flows may be transported across the ROHC channel 554, as well as having the channel 554 dedicated to individual ROHC enabled service flow. Therefore, the ROHC controller 528 and/or ROHC controller 542 may use a distinct context identifier space per channel. The ROHC controllers 528 and 542 may also eliminate context identifiers completely for one of the streams when few streams share a ROHC connection 554.

The ROHC channel 554 is formed between an ROHC compressor 530 and a ROHC decompressor 548. The ROHC compressor since transformed ROHC packets through a logical point-to-point connection dedicated to that traffic. In this manner, the compressors and decompressors provide a unidirectional ROHC across the ROHC channel 554. The ROHC uplink flow 563 extends from the compressor side to the decompressor side (in this example, mobile station 20-22 to the base transceiver station 104-116) by using the ROHC channel 554.

The ROHC feedback channel 561 extends from the decompressor side to the compressor side (in this example, the base transceiver station 104-116 to the mobile station 20-22) by using a dedicated channel or piggybacking/interspersing on an associated ROHC compressor channel in the reverse direction. When used, the ROHC feedback channel 561 (interspersed, piggybacked, et cetera) provides with the ROHC channel 554 the associated ROHC channels 560.

With respect to ROHC compression, different ROHC compression states exist, in which compression state decisions are made on information relayed on feedback from the decompressor via the feedback service flow 561 and periodic timeouts (such as when operating in a unidirectional mode, that is, simplex channels or when the feedback service flow 561 is not enabled)). The feedback provides information such as variations in packet headers, positive feedback from decompressor (such as acknowledgments (ACKs)), negative feedback from the decompressor (such as negative ACKs ((NACKs)).

Similar, with respect to the operations above, an ROHC channel may extend from a base transceiver station 104-116 to a mobile station 20-22 in a WiMAX networking environment. That is, the ROHC channel may originate from the ROHC compressor 546 to the ROHC decompressor 532 of mobile station 20-22, with an associated feedback channel when used.

Figure 7:
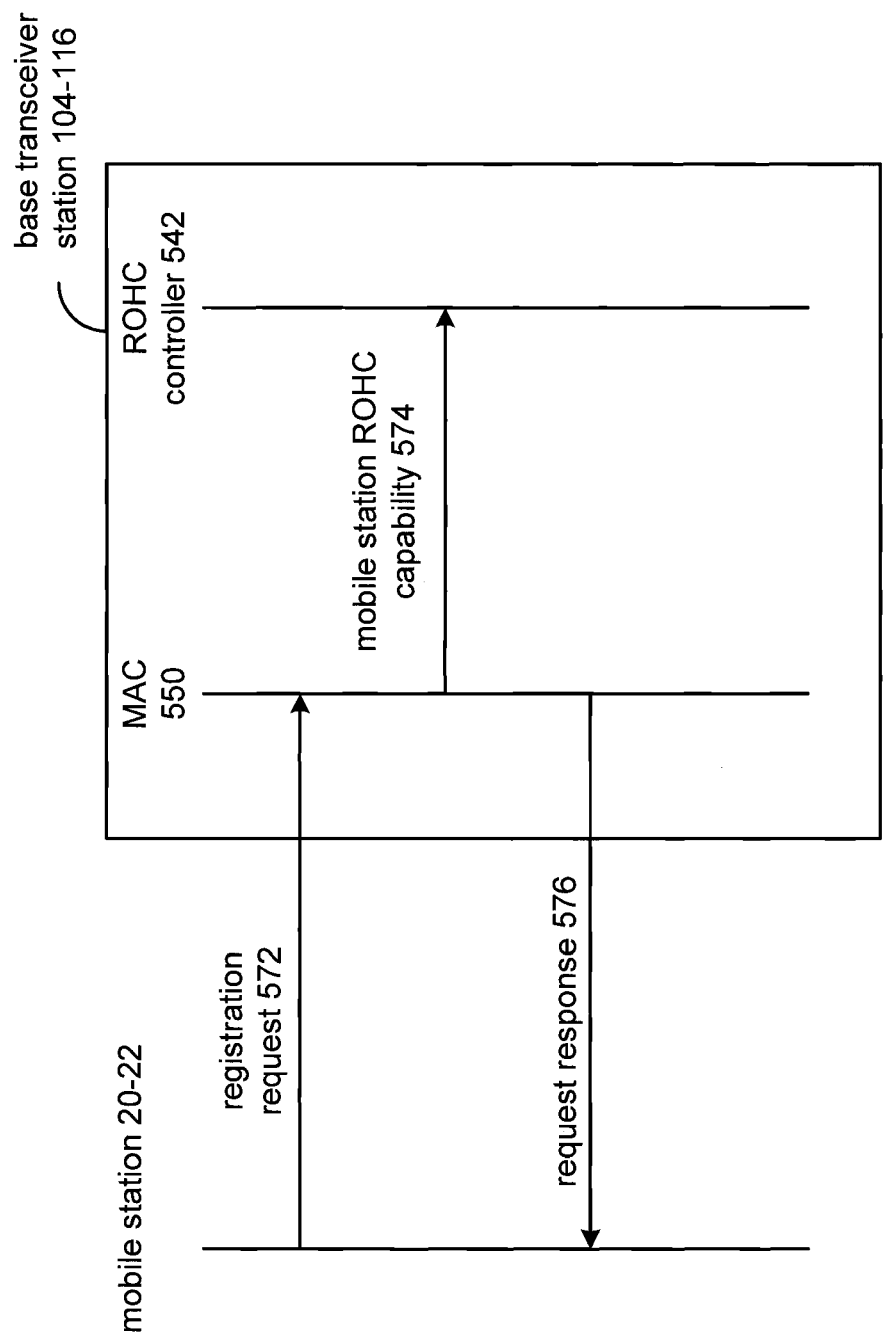
FIG. 7 is a flow diagram illustrating the registration of a mobile station with a WiMAX base transceiver station in accordance with an embodiment of the invention.

FIG. 7 is a flow diagram illustrating the registration of a mobile station 20-22 with a base transceiver station 104-116. The mobile station 20-22 provides a registration request 572 to the base transceiver station 104-116. The base transceiver station MAC 550 receives the request 572 and provides the information via a mobile station ROHC capability message 574 to the base transceiver station ROHC controller 542. The mobile station ROHC capability 574 includes information indicating whether the ROHC is supported by the mobile station 20-22, and manner in which to implement the ROHC channel and feedback channel, ROHC feedback strategy, et cetera. The base transceiver station MAC 550 provides a request response message 576 to the mobile station 20-22 indicating successful registration with the base transceiver station 104-116, and the negotiation of robust header compression capabilities that may be provided.

Upon registration, the ROHC capabilities are resolved between the devices, either of the mobile station in 20-22 or the base transceiver station 104-116 or the network side (such as the access service network/connectivity service network (ASN/CSN)) may initiate a ROHC-based service flow.

Figure 8:
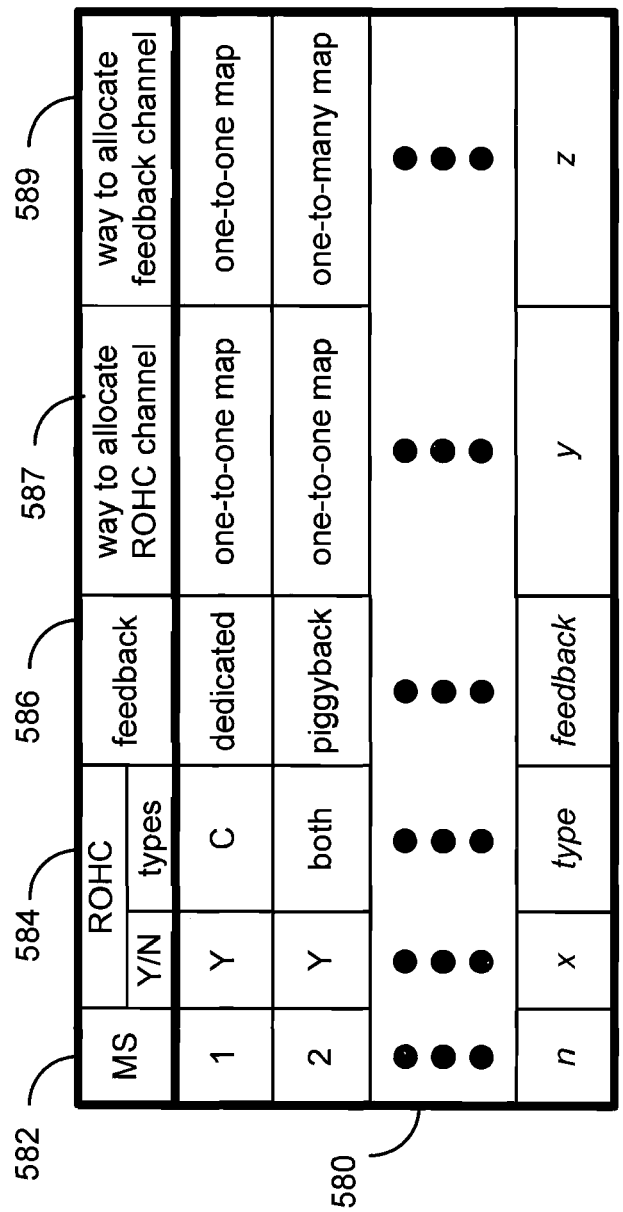
FIG. 8 illustrates a table containing information from the mobile station registration with a base transceiver station in accordance with an embodiment of the invention.

FIG. 8 illustrates a table 580 containing information from the mobile station registration with a base transceiver station. Generally, the table 580 may include additional information or various table structures adaptable to particular memory devices implemented in a base transceiver station, such as on local, remote, or distributed devices, storage or other applicable network devices.

The first column 582 providing mobile station identifiers for the mobile stations that have registered with the base transceiver station. The second column 584 contains information regarding the inability of a mobile station to engage in robust header compression. The column 586, contains information regarding the feedback capabilities, and the manner in which the feedback is to be provided. For example, feedback can be provided as a piggyback onto other ROHC compressed packets, or as interspersed packets within ROHC compressed packets or may be even provided as a dedicated feedback via a dedicated feedback channel.

Columns 587 and 589 relate to the way or allocation of the ROHC channel and the feedback channel, respectively. The allocation may be on a one-to-one basis (dedicated) or on a one-to-many basis (aggregated), and may differ between the channels.

The ROHC negotiation provides for establishing ROHC capability between WiMAX devices regarding feedback strategy, ROHC channel negotiation et cetera. In general, as one of ordinary skill in the art may appreciate, ROHC channel parameters are negotiated during service flow setup. When the mobile station is ROHC-capable and a service flow within the device enables ROHC operation, then the channel parameters for ROHC operation are implemented. Examples of service flow generation and/or creation is discussed in detail with reference to U.S. application Ser. No. 11/618,555, entitled "Data Path Creation for WiMAX Base Transceiver Station with Backhaul Access," filed Dec. 29, 2006, which is hereby incorporated herein by reference.

The ROHC channel negotiation (that is, capabilities) may be provided via a message subheader technique or special TLV (Time-Length-Value) definitions. Message subheaders convey mobile station ROHC capabilities (compression, decompression or both) and feedback strategies (dedicated, piggyback, interspersing) in a WiMAX environment.

These ROHC parameters can also be conveyed through special TLV (Time-Length-Value) definitions; however, WiMAX specifications are generally silent with respect to specifics of ROHC establishment in the WiMAX communication environment.

For example, a WiMAX special Time-Length-Value (TLV) definition, defines a bit for the "TLV type 7" (piggyback feedback messages on forward packets) of "REG-REQ/REG-RSP" messages indicating whether there is mobile station support ROHC for IP (version 4 and/or version 6) packets. But other ROHC capability and/or characteristics for ROHC channel channels are not provided, such as whether the airlink service flow channel 558 identified by CID is used as the ROHC channel, or whether one ROHC channel is allocated for all the ROHC enabled service flows in the same direction and with the same QoS and to the same mobile station (that is, airlink channel aggregation). Also not addressed are feedback strategies. That is, a feedback uses a feedback airlink channel, whether piggybacks and intersperses only applicable to bidirectional service flows, et cetera.

With respect to the ROHC channel parameters, WiMAX specifications address some special TLVs definitions that are communicated via DSx_REQ messages (that is, messages used to initiate WiMAX transactions). Such TLV definitions indicate an ROHC service flow support for IP (v4 and v6) packets; and provides a TLV in the DSx_REQ messages for large context ID space negotiation. Another TLV in the DSx_REQ messages provides for small context ID space. The WiMAX specification, however, does not address the negotiation of ROHC profiles for the ROHC channel and ROHC feedback channel IDs.

Figure 9:
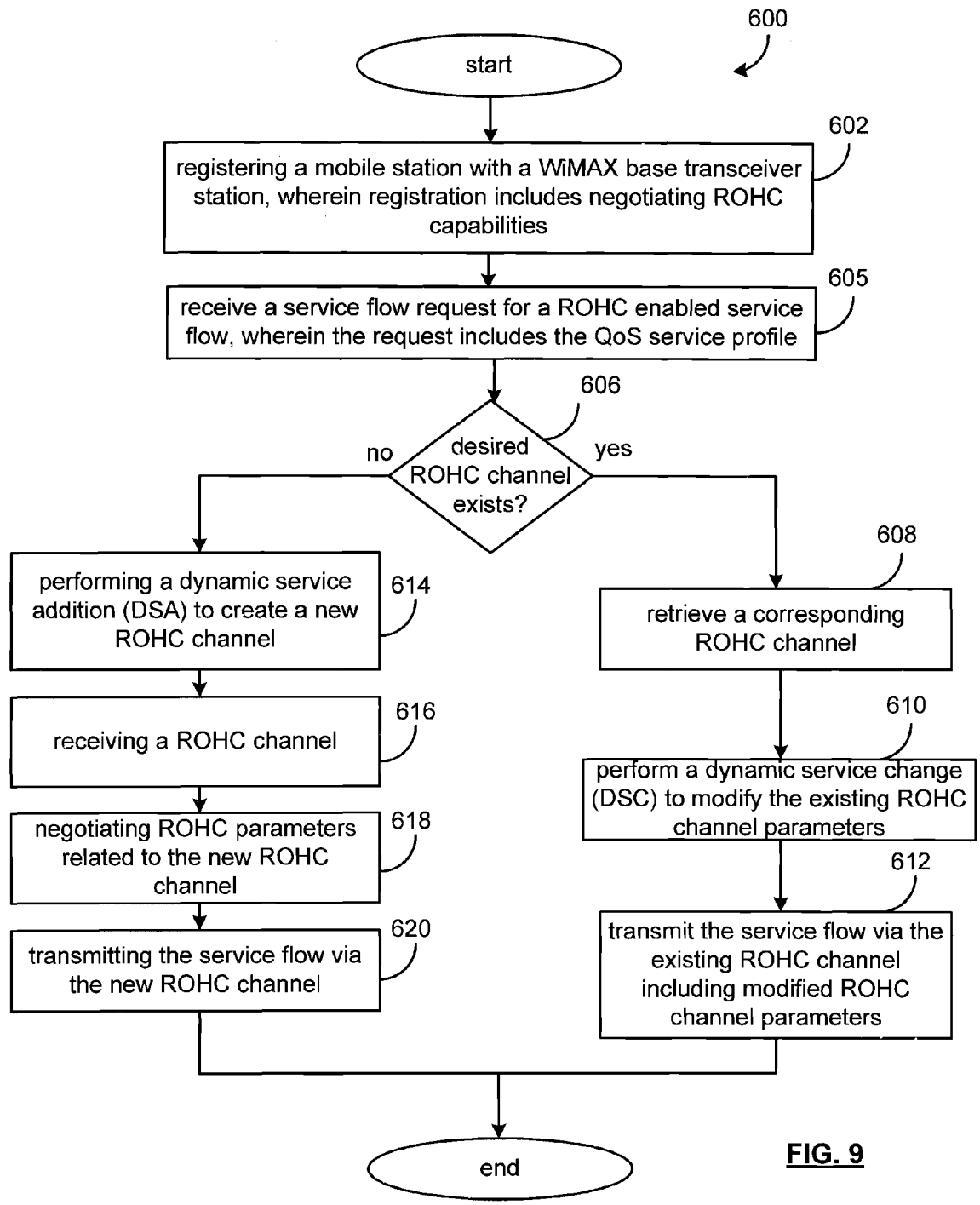
FIG. 9 is a flow diagram illustrating an embodiment of service flow processing of a ROHC wireless connection or session in a WiMAX wireless communication system.

FIG. 9 illustrates a method 600 in a robust header compression (ROHC) controller (ROHC) for service flow processing of a ROHC wireless connection or session in a WiMAX wireless communication system.

Beginning at step 602, a mobile station registers with a WiMAX base transceiver station, wherein registration includes negotiating ROHC capabilities with respect to a quality of service (QoS) service profile for a desired ROHC channel. When at step 604 the desired ROHC channel is an aggregated airlink service flow channel, the ROHC controller at step 605 receives a service flow request for a ROHC enabled service flow, wherein the request includes the QoS service profile. The QoS service profile indicates the nature of the payload contents and the priority of the payload with respect to delay sensitivity, bandwidth, et cetera. The request may be initiated by a mobile station 20-22 or a base transceiver station 110-116.

At step 606, a service flow request is provided for an ROHC enabled service flow. The ROHC controller determines whether the desired ROHC service flow exists based upon the QoS service profile within the request. In other words, whether the desired ROHC channel for the ROCH enabled service is pre-existing.

When, at step 606, such an ROHC service flow exists, then at a step 608, the ROHC controller retrieves a corresponding ROHC channel, and performs a dynamic service change (DSC) to modify the existing ROHC channel parameters, as needed, at step 610. At step 612, with the existing ROHC channel parameters modified as needed at step 610, the service flow is transmitted via the existing ROHC channel with modified parameters.

When, at step 606, such a service flow does not exist, then at step 614 the ROHC controller performs a dynamic service addition (DSA) to create a new ROHC channel in a unidirectional ROHC mode. At step 616 ROHC controller receives an ROCH channel for the service flow, and negotiates at step 618 the ROHC parameters for the new ROHC channel. With the new ROHC channel, the ROHC controller transmits the service flow via the new ROHC channel at step 620.

Through the method of FIG. 9, a mobile station communicating with a base transceiver station can have a different service flow and the mobile station can change its service flow according to the available resources of that WiMAX system.

Figure 10:
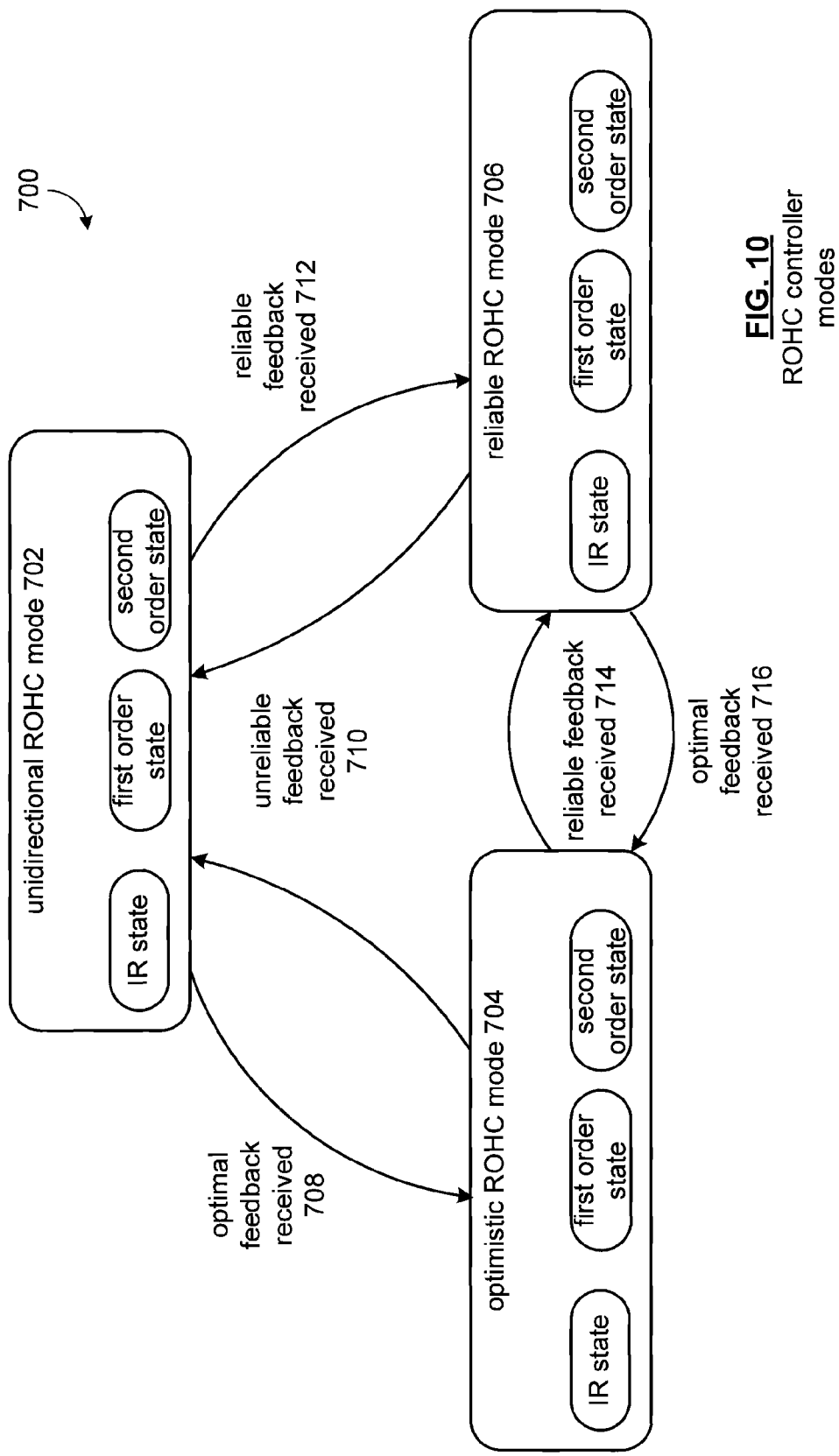
FIG. 10 illustrates a state diagram 700 relating to operational modes of a ROHC controller according to an embodiment of the invention.

FIG. 10 illustrates a state diagram 700 relating to operational modes of a ROHC controller for ROHC profile 1 and profile 2 for the compressor. The operational modes include a unidirectional ROHC mode 702, an optimistic ROHC mode 704, and a reliable ROHC mode 706. Each of the modes 702, 704, and 706, include an IR compression state, a first order compression state, and a second order compression state.

In general, the optimal mode that a ROHC controller operates depends on the characteristics of the environment of the compression protocol, such as feedback abilities, error probabilities and distributions, effects of header variation, et cetera.

In the unidirectional ROHC mode 702 services flows are sent in one direction only, from the compressor to the decompressor. This mode therefore makes robust header compression usable over links where a feedback service flow from decompressor to compressor is unavailable or undesirable.

Compression with ROHC begins with the unidirectional ROHC mode 702. Transition to any of the bidirectional modes 704 and 706 can be performed when a packet of the service flow reaches the decompressor, and the decompressor replies with a feedback packet indicating that a mode transition is desired.

The bidirectional optimistic ROHC mode 704 is similar to the unidirectional ROHC mode 702. The difference is that a feedback sends error recovery requests and acknowledgments of significant context updates from the decompressor to compressor. The bidirectional optimistic ROHC mode 704 operates to reduce the number of damaged headers delivered to the upper layers due to residual errors or context invalidation. The frequency of context invalidation may be higher than for reliable ROHC mode 706, in particular when long loss/error bursts occur.

The bidirectional reliable ROHC mode 706 makes intensive usage of the feedbacks and a stricter logic at both the compressor and the decompressor to prevent loss of context synchronization between compressor and decompressor. Feedback is sent via the feedback channel to acknowledge all context updates, including updates of the sequence number field.

In general, ROHC compression can be characterized as an interaction between a compressor and a decompressor, each interaction occurring once per context. The compressor and the decompressor each have three states. Both the compressor and the decompressor start in the lowest compression state and transit gradually to higher states.

With respect to the compressor states, the compressor operates in the highest possible compression state, under the constraint that the compressor is sufficiently confident that the decompressor has the information necessary to decompress a header compressed according to that state.

The purpose of the Initialization and Refresh (IR) State is to initialize the static parts of the context at the decompressor or to recover after failure. In this state, the compressor sends complete header information. This includes all static and nonstatic fields in uncompressed form plus some additional information. The compressor stays in the IR state reasonably confident that the decompressor has received the static information correctly.

The purpose of the First Order (FO) compressor states are to efficiently communicate irregularities in the packet stream. When operating in this state, the compressor rarely sends information about all dynamic fields, and the information sent is usually compressed at least partially. Only a few static fields can be updated. The difference between IR and FO should therefore be clear.

Under the Second Order (SO) state, the header compression is optimal. The compressor enters the SO state when the header to be compressed is substantially predictable given the RTP Sequence Number (SN), and the compressor is sufficiently confident that the decompressor has acquired all parameters of the functions from SN to other fields. Correct decompression of packets sent in the SO state only hinges on correct decompression of the SN. Successful decompression, however, also requires that the information sent in the preceding FO state packets has been successfully received by the decompressor.

FIG. 11 is a state diagram relating to the decompressor state transitions for the ROHC modes 702, 704, and 706 of FIG. 1 for profile 1 and profile 2. The state machine includes a no context state 812, a static context state 814, and a full context state 816. The ROHC controller starts the decompressor in its lowest compression state, "No Context" state 812 and gradually transits to higher states. The decompressor state machine generally does not leave the "Full Context" state 816 once it has entered this state.

Underlying operation and mechanisms relating to robust header compression and decompression are discussed in further detail in "RObust Header Compression (ROHC): Framework and four profiles: RTP, UDP, ESP, and uncompressed," IETF Request For Comment 3095 (July 2001).

In the manner provided herein, a ROHC enabled service flow and ROHC sessions within this service flow may be implemented between a mobile station and base transceiver station via a QoS service profile. Accordingly, provisioning of ROHC service flows are provided such that multiple service flows may be accommodated within an ROHC channel over the airlink with ROHC service flow aggregation with the same QoS parameters and to the same mobile station, either utilizing existing ROHC service flows, or creating additional ROHC service flows as needed; or ROHC channel maps to the service flow airlink channel in one-to-one relationship, therefore there is no aggregation.

The embodiments of the invention disclosed herein are susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for service flow processing of a ROHC wireless connection or session in a robust header compression (ROHC) controller of a WiMAX wireless communication system comprising:
   registering a mobile station with a WiMAX base transceiver station, wherein registration includes negotiating ROHC capabilities;
   receiving a service flow request for a ROHC enabled service flow, wherein the request includes a Quality of Service (QOS) service profile that is indicative of a priority and contents of a payload conveyed on a desired ROHC channel;
   wherein in response to a determination that the desired ROHC channel is an aggregated airlink service flow channel:
      determining whether the desired ROHC channel exists based upon the QoS service profile; and
      wherein in response to a determination that the desired ROHC channel exists,
         retrieving the existing ROHC channel;
         performing a dynamic service change (DSC) to modify parameters of the existing ROHC channel; and
         transmitting the service flow via the existing ROHC service flow with modified parameters;
      wherein in response to a determination that the desired ROHC channel does not exist:
         performing a dynamic service addition (DSA) to create a new ROHC channel;
         receiving the new ROHC channel;
         negotiating ROHC parameters related to the new ROHC channel; and
         transmitting the service flow via the new ROHC channel.

2. The method of claim 1, wherein when the desired ROHC channel is a one-to-one air link service flow channel: receiving a service flow request for a ROHC enabled service flow, the service flow request including ROHC channel parameters; and establishing an airlink unidirectional channel for the ROHC enabled service flow based upon the channel parameters to carry the ROHC enabled service flow, the ROHC enabled service flow including a plurality of ROHC sessions and uncompressed sessions.

3. The method of claim 1 wherein the ROHC channel has a feedback channel when a feedback is negotiated based upon the negotiated ROHC capabilities.

4. The method of claim 3 further comprises: upon detecting the feedback, transitioning from a unidirectional ROHC mode to a bidirectional ROHC mode for the ROHC.

5. The method of claim 4 wherein the bidirectional ROHC mode comprises at least one of a bidirectional optimistic ROHC mode and a bidirectional reliable ROHC mode.

6. The method of claim 5 wherein each of the unidirectional ROHC mode, bidirectional optimistic ROHC mode and the bidirectional reliable ROHC mode has a context state indicating ROHC compression and decompression information.

7. The method of claim 6 wherein the context state includes at least an initialization and refresh, a first order, and a second order compressor state, and includes at least a no context, a static content, and a full content decompressor state, wherein each state relates to a respective compression level and decompression level.

8. The method of claim 1 wherein negotiating ROHC channel parameters related to the ROHC channel comprises: extracting ROHC channel parameters from a ROHC channel parameters extended subheader; and comparing the extracted ROHC channel parameters with supported ROHC channel parameters; and selecting the ROHC channel parameters common to both the extracted ROHC channel parameters and the supported ROHC channel parameters.

9. The method of claim 1 wherein negotiating the ROHC capabilities comprises: extracting a special TLV (Time-Length-Value) definition; and comparing the extracted ROHC capabilities with supported ROHC capability parameters; and selecting the ROHC capability parameters common to both the extracted ROHC capability parameters and the supported ROHC capability parameters.

10. The method of claim 1 wherein negotiating ROHC channel parameters comprises: extracting ROHC channel parameters from at least one DSx message; comparing the extracted ROHC channel parameters with supported ROHC channel parameters; and selecting the ROHC channel parameters common to both the extracted ROHC channel parameters and the supported ROHC channel parameter.

11. The method of claim 1 wherein the ROHC channel has a feedback channel when a wireless reverse channel is present.

12. A mobile station of a WiMAX wireless network including service flow processing of a ROHC wireless channel and sessions within the channel in the WiMAX wireless network, the mobile station comprising:
   a user interface;
   a radio frequency (RF) unit that provides an interface between the mobile station and at least one base transceiver station of the wireless network;
   at least one digital processor coupled to the RF unit and the user interface; and
   memory coupled to the at least one digital processor, wherein the memory stores operational instructions, which when executed cause the digital processor to:
      in response to a determination that a desired ROHC channel is an aggregated airlink service flow channel:
         receive a service flow request for a ROHC enabled service flow, wherein the request includes a Quality of Service (QOS) service profile that is indicative of a priority and contents of a payload conveyed on a desired ROHC channel;
         determine whether the requested ROHC service flow exists based upon the QoS service profile; and
         wherein in response to a determination that the ROHC channel exists:
            retrieve a corresponding ROHC channel;
            perform a dynamic service change (DSC) to modify ROHC channel parameters of the ROHC channel; and
            transmit the service flow via the existing ROHC channel including modified ROHC channel parameters;
         wherein in response to a determination that the ROHC channel does not exist:
            perform a dynamic service addition (DSA) to create a new ROHC channel;
            receive the new ROHC channel;
            negotiate ROHC channel parameters related to the new ROHC channel; and transmit the service flow via the new ROHC channel.

13. The mobile station of claim 12, wherein when the desired ROHC channel is a one-to-one to air link service flow channel, the memory further stores operational instructions that further cause the at least one digital processor to: receive a service flow request for a ROHC enabled service flow, the service flow request including ROHC channel parameters; and establishing an airlink unidirectional channel for the ROHC enabled service flow based upon the ROHC channel parameters to carry the ROHC enabled service flow, the ROHC enabled service flow including a plurality of ROHC sessions and uncompressed sessions.

14. The mobile station of claim 12 wherein the ROHC channel includes a feedback channel when a feedback is negotiated based upon the negotiated ROHC capabilities.

15. The mobile station of claim 12, wherein the memory further stores operational instructions that further cause the at least one digital processor to: upon detecting feedback packets, transition from a unidirectional ROHC mode to a bidirectional ROHC mode for the ROHC.

* * * * *